United States Patent [19]

Bell

[11] 3,976,152

[45] Aug. 24, 1976

[54] WHEELCHAIR HAVING PIVOTABLE RAMP FOR CLIMBING CURBS

[76] Inventor: Albert Bell, 49 Norris Hill Drive, Heaton Norris, Stockport, SK4 2NR, England

[22] Filed: Nov. 15, 1974

[21] Appl. No.: 524,182

[30] Foreign Application Priority Data

Dec. 5, 1973 United Kingdom ............... 56365/73

[52] U.S. Cl. .................................. 180/9; 280/5.24; 280/42; 280/47.41; 280/242 WC; 280/DIG. 10

[51] Int. Cl.[2] ...................... B62D 17/00; B62B 9/02

[58] Field of Search ............ 280/5.24, 5.2, 5.2–5.32, 280/42, 47.41, 242 WC, DIG. 10; 180/9, 8 A

[56] References Cited

UNITED STATES PATENTS

| | | | |
|---|---|---|---|
| 1,301,593 | 4/1919 | Panzner et al. | 280/5.24 |
| 1,327,864 | 1/1920 | Everingham | 280/DIG. 10 |
| 1,610,921 | 12/1926 | Borowski et al. | 280/5.24 |
| 1,739,260 | 12/1929 | Roe | 280/5.2 |
| 2,669,289 | 2/1954 | Usher et al. | 280/42 X |
| 2,712,357 | 7/1955 | Fulton et al. | 280/5.22 X |
| 3,613,813 | 10/1971 | Biddle | 280/42 |

*Primary Examiner*—M. H. Wood, Jr.
*Assistant Examiner*—Milton L. Smith
*Attorney, Agent, or Firm*—Sughrue, Rothwell, Mion, Zinn & Macpeak

[57] ABSTRACT

A wheelchair provided with pivotable ramps to enable curb-climbing which is provided with means to enable it to mount curbs. The wheelchair comprises three or more wheels and at least one pivotally mounted arm on which a ramp member is itself pivotally mounted. The or each arm may be pivoted to a position in which the ramp it supports is placed in a predetermined orientation in the path of a respective wheel or the chair so that the said respective wheel may run up the ramp to mount a curb.

14 Claims, 5 Drawing Figures

WHEELCHAIR HAVING PIVOTABLE RAMP FOR CLIMBING CURBS

BACKGROUND OF THE INVENTION

1. Field of the Invention

The present invention relates to wheelchairs.

2. Description of the Prior Art

Wheelchairs provided with pivotable ramps to enable curb climbing have been provided which can climb curbs of for example 3½inch height. However, excessively large driven wheels and/or very powerful and heavy motors are required. Also, there is a danger that the chair will tip over when such an operation is attempted. Furthermore, discomfort can be caused to an occupant of the chair as a result of the inclination of the seat portion thereof as the chair mounts the curb. Additionally, in the case of electrically powered wheelchairs, a breakdown of the drive due to either a mechanical fault or discharged batteries means that the chair is very difficult to move as the electric drive is still engaged.

SUMMARY OF THE INVENTION

According to the present invention, there is provided a wheelchair comprising at least three wheels and at least one pivotal arm on which a ramp is pivotally mounted, the arm being pivotable to a position in which the ramp it supports is placed in a predetermined orientation in the path of a respective wheel, and the ramp being shaped and supported by the arm so that when it is so placed and the wheelchair is advanced the respective wheels runs up it.

Preferably, the or each arm is pivoted about the axle of the respective wheel and magnetic means are provided for engaging the arm with the wheel so as to rotate therewith. The arm is preferably telescopic, and the ramp of triangular section.

The wheelchair may comprise at least one outrigger, which can be arranged to extend laterally from the wheelchair, the outrigger being dimensioned so that when the wheelchair is placed on a planar surface a portion of the extended outrigger is located a predetermined distance above the planar surface, the predetermined distance being such that if the chair begins to tip over in the direction in which the outrigger extends, the outrigger will contact the planar surface and prevent the chair from tipping further.

The chair or seat portion of the wheelchair may be pivotally mounted so that is may be maintained in a substantially horizontal orientation when the wheelchair is on an inclined surface.

The wheelchair may comprise an electric motor arranged to drive one or more of the wheels, a clutch mechanism arranged to engage the said one or more of the wheels with the electric motor, and means for disengaging the clutch, the disengaging means being arranged so as to make their operation by a person sitting on the chair difficult.

The present invention also provides a wheelchair comprising a frame having two side members linked by struts the length of which may be adjusted. Each strut may comprise at least two rods having threaded ends engaged by a threaded member, the threads being arranged so that the distance between the said ends and thus the length of the strut may be adjusted by turning the member relative to the rods.

BRIEF DESCRPTION OF THE DRAWINGS

An embodiment of the present invention will now be described, by way of example, with reference to the accompanying drawings, in which.

DESCRIPTION OF THE PREFERRED EMBODIMENTS

Figure 3:
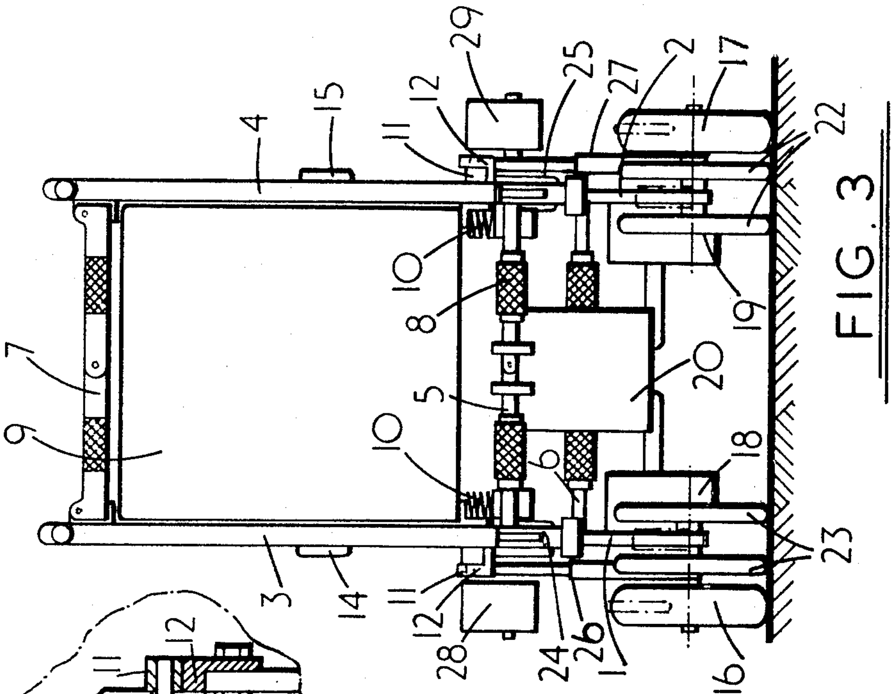
FIGS. 1, 2 and 3 are respectively front, side and rear views of a wheelchair according to the invention.
Figure 5:
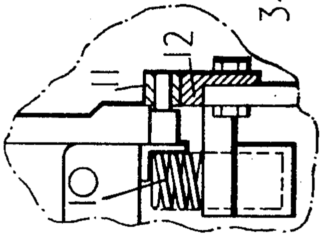
FIG. 5 is an enlarged view of a portion of FIG. 1.

The wheelchair illustrated comprises a frame formed by two rigid side members 1, 2 to which two uprights 3, 4 are pivoted. The members 1, 2 are linked by foldable cross-members 5, 6 and the uprights 3, 4 by a foldable cross-member 7. Each of the cross-members 5, 6 and 7 is formed by oppositely threaded sections linked by knurled internally threaded cylinders, for example 8. The cylinders may be twisted to adjust the length of the cross-members and hence the width of the chair.

The frame pivotally supports a seat 9, the back portion of which is not fixed relative to the uprights 3, 4, The lower portion of the seat 9 is supported on four springs 10 arranged at its corners and a pair of pins 11 pivotally received in brackets 12. Each pin 11 and bracket 12 may be secured in a variety of positions relative to the seat 9 and side members 1, 2, respectively in slots 13. The combined pivotal and spring mounting of the seat provides for some compensation of the seat position relative to the vertical when the wheelchair is on an inclined surface. This makes the user feel more secure. The positions of the pins 11 and brackets 12 are adjustable so that the pivot point may be moved relative to the seat to a position beneath the normal center of gravity of the user and chair.

It will be appreciated that the seat could be supported in a more conventional manner, for example on pins supported by the uprights 3, 4 and the frame members 1, 2. The seat supports arms 14, 15 which may be adjusted in height.

The frame supports two front wheels 16, 17 on shafts arranged to be driven by electric motors 18, 19 powered by batteries 20. A motor control lever 21 is provided on arm 15. Of course, the lever 21 could be provided on arm 14 if desired.

The lever 21 can be moved from a neutral position into any one of eight different operative positions. Each of the operative positions of the lever connects the electric motors to the batteries 20 in a different way. Using the words "forward" and "reverse" to convey the direction of motion of the driven wheel in question with respect to the front and back of the wheelchair, the effect of placing the lever in each of the positions is set out below.

Position 1 Both wheels 16 and 17 rotate in the forward direction.

Position 2 Both wheels 16 and 17 rotate in the reverse direction.

Position 3 Wheel 16 rotates forward, wheel 17 rotates in reverse.

Position 4 Wheel 17 rotates forward, wheel 16 rotates in reverse.

Position 5 Wheel 16 rotates forward, wheel 17 remains stationary.

Position 6 Wheel 17 rotates forward, wheel 16 remains stationary.

Position 7 Wheel 16 rotates in reverse, wheel 17 remains stationary.

Position 8 Wheel 17 rotates in reverse, wheel 16 remains stationary.

Position Center gives neutral position.

The lever is arranged so as to protrude from a control box concealed by the arm 15 through a plate having an eight-pointed star-shaped aperture therein. The lever is biased to a central position, but can be moved into one of the points of the "star". Contacts operatively connected to the lever are adapted to complete one of the eight circuits when the lever is moved to one of the eight positions. Preferably the batteries 20 and lever 21 are so connected that when the wheelchair is driven in reverse only a relatively low maximum speed can be achieved.

Preferably the batteries 20 are mounted in a casing which is detachably mounted on the wheelchair by hooking it onto the cross-members 5, 6.

Four rear wheels are provided in two pairs, 22, 23. All six wheels are of 8 inch diameter. The pairs of wheels 22, 23 are supported on respective common axes on uprights rotatably received in brackets 24, 25 respectively supported by side members 1, 2.

The shaft of each wheel 16, 17 has a respective arm 26, 27 journalled thereon, each arm being telescopic and sprung and pivotally supporting adjacent its free end a ramp 28, 29. Each ramp is weighted so as to always assume substantially the orientation shown in FIG. 2.

Figure 4:
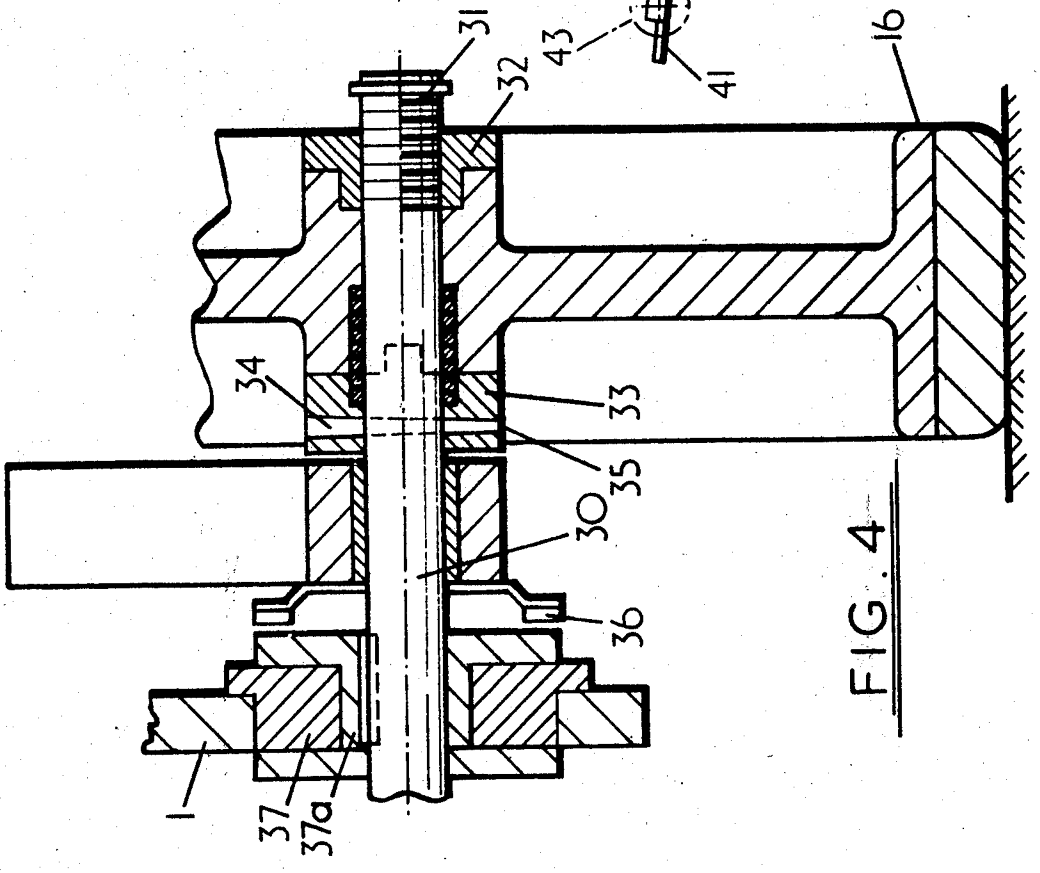
FIG. 4 is a section through one of the front wheels of the wheelchair of FIGS. 1, 2 and 3.

Referring now to FIG. 4, the wheel 16 is shown as being rotatably mounted on a shaft 30 having a threaded end 31 on which a nut 32 is retained. The shaft 30 is driven by the motor 18. The shaft 30 supports a collar 33 keyed thereto by a pin 34, and a spring 35 ia arranged between the collar 33 and the wheel 16. The wheel 16 is normally held against the collar 33 by the nut 32, the mating faces of the collar and wheel being provided with a dog arrangement so that the wheel rotates with the shaft 30. If the nut 32 is loosened, the spring 35 pushes the wheel 16 out of engagement with the collar 33 so that the wheel can then run freely on the shaft 30. In the event of a failure of power making it necessary to push the wheelchair, this would normally be very difficult due to regenerative braking caused by the driving of the motor by rotation of the shaft 30. If however the nut 32 is loosened, the wheelchair may simply freewheel. The positioning and arrangement of the nut 32 makes its release by a user of the wheelchair difficult, reducing the likelihood of a dangerous "run-away" of the wheelchair.

The arm 26 is rotatably supported by the shaft 30 and supports a plate 36 on its side facing the frame side member 1. A magnetic assembly 37 which is connected for energization to the batteries 20 is supported by the side member 1, the shaft 30 having a member 37*a* keyed thereto which is rotatably received by the member 37. The arrangement is such that normally the assembly 37 is not energized and the plate 36 does not engage with the member 37*a*. The arm 26 is thus free to rotate relative to the shaft 30 but is maintained in the position shown in FIGS. 1 to 3 by a catch arrangement (not shown) supported by the frame. The catch arrangement could comprise a spring-mounted arm for example, the strength of the spring being such that the arms 26, 27 can be normally supported. A user of the wheelchair can by depressing a button or switch (not shown) on one of the arms 14, 15 energize the assembly, and as a result the arm 26 comes into engagement with the member 37*a*. The arm then rotates with the wheel 16, overcoming the force of the spring of any catch arrangement which is provided. Each arm 26, 27 has an identical magnetic control arrangement.

Figure 1:
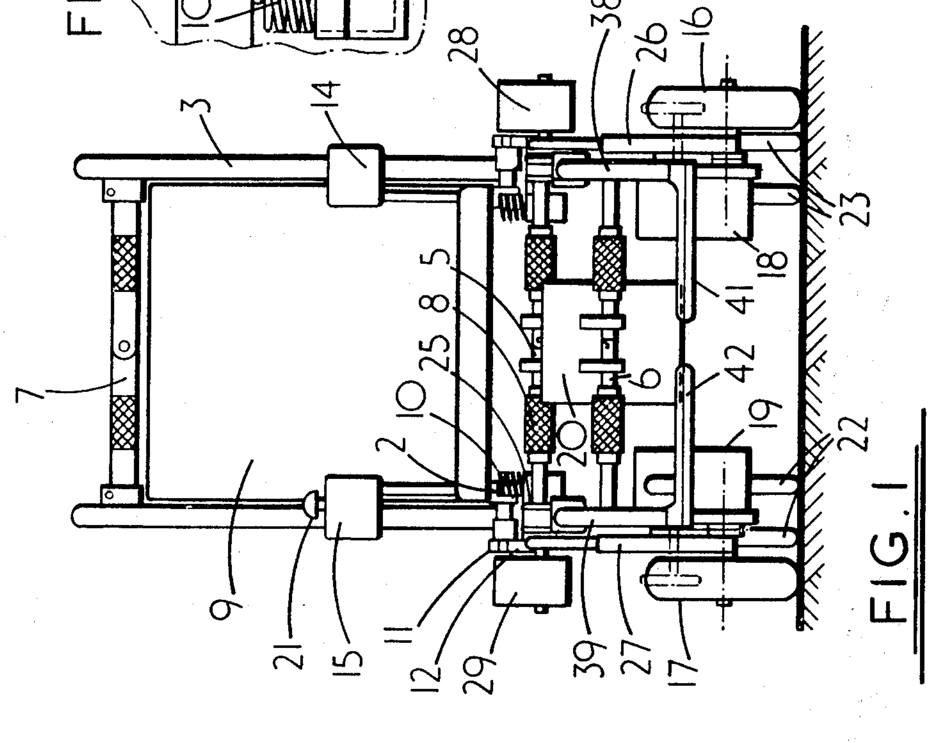
Figure 2:
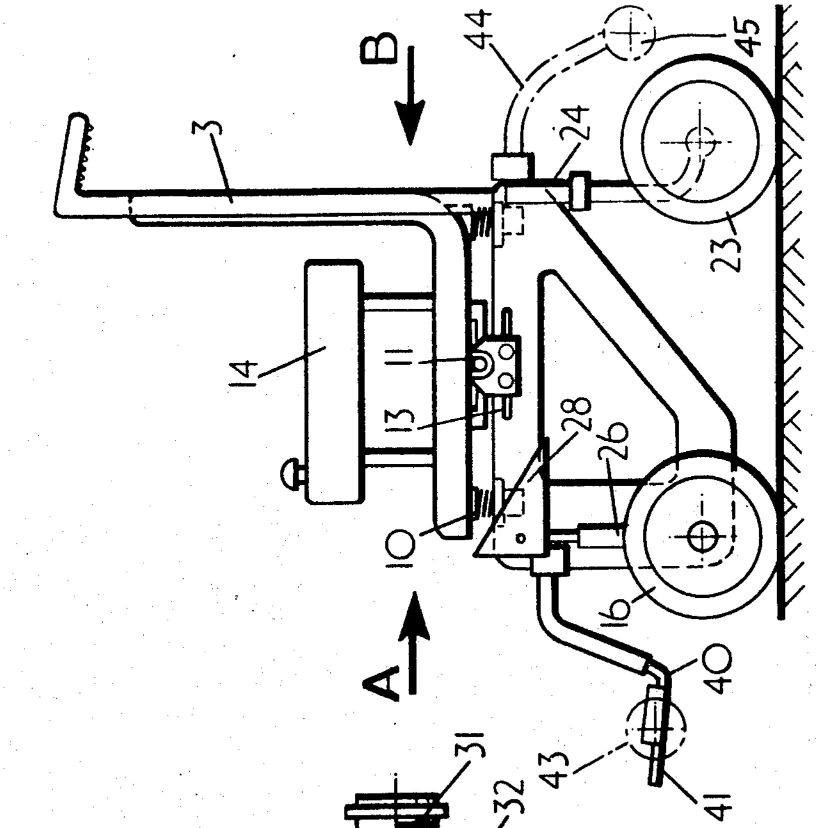

In normal use of the wheelchair on a smooth surface, each arm 26, 27 is held in an upwardly extending position as shown in FIGS. 1 to 3. When for example a curb is encountered, the user maneuvers the wheelchair to a short distance therefrom and energizes the magnetic assembly of each arm. The user then moves the wheelchair forward, causing the arms to rotate with the wheels. The weighting of the ramps and the movement of the wheelchair causes the ramps to be placed on the surface in front of the wheels. The magnetic control arrangements are then de-energized and the wheelchair is advanced so that its wheels run on the ramp and mount the curb, the arms 26, 27 rotating on the drive shafts. The telescopic arms allow for changes in the distance between the shafts and ramp pivots during this operation. When the wheelchair has mounted the curb, the magnetic control arrangements are energized and the continuing advance of the wheelchair causes the arms to assume an upwardly extending position. A limit switch (not shown) supported on the frame is actuated by one of the arms and the magnetic assemblies are de-energized so that normal use of the wheelchair can be recommenced. The limit switch may comprise a lever which after being pivoted by the movement of the arm 26 or 27, springs back to prevent the arm 26, 27 rotating backwards when the magnetic arrangements are de-energized.

It will be appreciated that alternative arrangements to that described may be provided for controlling the arms.

Referring again to FIGS. 1 to 3, a footrest is provided comprising two arms 38, 39 which may be adjusted to a variety of angles to the vertical and to the respective side members 1, 2 to suit particular users. Each arm is tubular and receives a rod 40 on which a foot plate 41, 42 is pivotally supported. The position of the rods 40 within the arms 38, 39 may be adjusted, again to suit particular users. Each foot plate 41, 42 may also support a small wheel 43 so that if the wheelchair tips forward the small wheel contacts the ground and prevents further tipping. The small wheel 43 may be supported on a cranked arm which may be secured in a variety of positions relative to the foot plate. Furthermore, a pair of outriggers 44 (FIG. 2) may be secured to the back corners of the frame for outdoor use to prevent the wheelchair tipping over backwards. Again a small wheel 45 may be supported on the end of each outrigger.

When it is desired to fold the wheelchair for example for transport, the seat 9 is lifted from the frame and handled separately. The uprights 3 and 4 are then folded down for pivoting onto the side members 1, 2 by releasing over-center catches shown in FIG. 2, the cross-members 6, 7 and 8 which are pivoted at each of their ends and midway along their lengths are folded, and the plates 41, 42 are pivoted upwards.

It will be appreciated that as the width of the wheelchair may be adjusted by manipulating the cylinders 8, and the arms 14, 15 and footrest may be vertically adjusted, a variety of sizes of person may be accomodated by the wheelchair, or the growth of a child may be accommodated. It may be necessary to change the seat portion which is not of adjustable dimensions as a child grows, but it is not necessary to change the entire chair.

What is claimed is:

1. A wheelchair comprising at least three wheels and at least one pivotal arm on which a ramp is pivotally mounted, the arm being pivotable to a position in which the ramp it supports is placed in a predetermined orientation in the path of a respective wheel, the ramp being triangle shaped and supported by the arm so that when it is so placed and the wheelchair is advanced the respective wheel runs up it, and the ramp being weighted so as to assume a substantially uniform orientation whatever the position of the arm relative to its pivot.

2. A wheelchair according to claim 1, wherein the arm is pivoted about the axle of the respective wheel.

3. A wheelchair according to claim 2, comprising means for alternately locking the arm to a frame of the wheelchair or to the respective wheel so as to rotate therewith.

4. A wheelchair according to claim 3, wherein the locking means in respect of the arm comprises means arranged to engage the arm with the frame and an electromagnet energisable to disengage the arm from the frame and engage it with the respective wheel.

5. A wheelchair according to claim 1, wherein the arm is telescopic and sprung so that it is normally extended.

6. A wheelchair according to claim 1, comprising at least one outrigger which can be arranged to extend laterally from the wheelchair, the outrigger being dimensioned so that when the wheelchair is placed on a planar surface a portion of the extended outrigger is located a predetermined distance above the planer surface, the predetermined distance being such that if the chair begins to tip over in the direction in which the outrigger extends, the outrigger will contact the planar surface and prevent the chair from tipping further.

7. A wheelchair according to claim 6, wherein the outrigger supports a wheel arranged to be lower than any other part of the outrigger.

8. A wheelchair according to claim 1, wherein the chair portion thereof is pivotally mounted so that it may be maintained in a substantially horizontal orientation when the wheelchair is on an inclined surface.

9. A wheelchair according to claim 8, wherein the lower portion of the seat is supported on springs and a pivot whose position relative to the chair can be adjusted.

10. A wheelchair according to claim 1, comprising an electric motor arranged to drive at least one of the wheels.

11. A wheelchair according to claim 10, comprising a clucth for engaging said wheel with the electric motor, and means for disengaging the clutch, the disengaging means being mounted on the hub of said wheel, whereby its operation by a person sitting on the chair is difficult.

12. A wheelchair as defined in claim 1 comprising a frame having two side members linked by struts the length of which may be adjusted.

13. A wheelchair according to claim 12, wherein each strut comprises at least two rods having threaded ends engaged by a threaded member, the threads being arranged so that the distance between the said ends and thus the length of the strut may be adjusted by turning the member relative to the rods.

14. A wheelchair according to claim 13, wherein each strut comprises two pivotally connected links each of which itself comprises two of the said rods and a threaded member.

* * * * *